(12) United States Patent
Uragami et al.

(10) Patent No.: US 10,302,938 B2
(45) Date of Patent: May 28, 2019

(54) LIGHT SOURCE DEVICE AND IMAGE DISPLAY APPARATUS

(71) Applicant: Panasonic Intellectual Property Management Co., Ltd., Osaka (JP)

(72) Inventors: Susumu Uragami, Osaka (JP); Hiroyuki Furuya, Osaka (JP); Takahisa Shiramizu, Saga (JP); Akira Kurozuka, Osaka (JP); Yuta Yamamoto, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 110 days.

(21) Appl. No.: 15/413,496

(22) Filed: Jan. 24, 2017

(65) Prior Publication Data

US 2017/0227763 A1 Aug. 10, 2017

(30) Foreign Application Priority Data

Feb. 8, 2016 (JP) .................................. 2016-021422
Feb. 12, 2016 (JP) .................................. 2016-024275

(51) Int. Cl.
*G02B 27/01* (2006.01)
*F21V 14/04* (2006.01)
(Continued)

(52) U.S. Cl.
CPC .......... *G02B 27/0101* (2013.01); *F21V 13/04* (2013.01); *F21V 14/04* (2013.01);
(Continued)

(58) Field of Classification Search
CPC ........ G03B 21/14; G03B 21/26; G03B 21/28; G02B 27/0093; G02B 27/0101; G02B 27/0172; G02B 27/0143
See application file for complete search history.

(56) References Cited

U.S. PATENT DOCUMENTS 5,400,133 A * 3/1995 Hinton ................... G01B 11/27
356/138
6,157,478 A * 12/2000 Naiki ................... G02B 26/123
347/243

(Continued)

FOREIGN PATENT DOCUMENTS

JP 6-077102 U 10/1994
JP 2008-529069 7/2008
(Continued)

*Primary Examiner* — Sultan Chowdhury
(74) *Attorney, Agent, or Firm* — McDermott Will & Emery LLP

(57) ABSTRACT

A light source device includes a laser light source, a first adjustment mechanism, a second adjustment mechanism, and a mirror. The laser light source emits laser light. The first adjustment mechanism is configured such that the laser light from the laser light source is incident thereto, and performs an emission angle adjustment of the laser light and a focus adjustment of the laser light. The second adjustment mechanism is configured such that the laser light from the first adjustment mechanism is incident thereto, and performs a positional adjustment of the incident laser light. The mirror is configured such that the laser light from the second adjustment mechanism is incident thereto, and emits the incident laser light in a predetermined direction. An image display apparatus includes the above light source device.

11 Claims, 18 Drawing Sheets

(51) Int. Cl.
  *G03B 21/14*   (2006.01)
  *F21V 13/04*   (2006.01)
  *G09F 13/00*   (2006.01)
  *F21Y 115/30*   (2016.01)
  *F21V 29/74*   (2015.01)
  *G03B 21/16*   (2006.01)

(52) U.S. Cl.
  CPC ........... *G03B 21/145* (2013.01); *G09F 13/00* (2013.01); *F21V 29/74* (2015.01); *F21Y 2115/30* (2016.08); *G02B 2027/0112* (2013.01); *G03B 21/16* (2013.01)

(56)         References Cited

U.S. PATENT DOCUMENTS

| | | |
|---|---|---|
| 2006/0119804 A1 | 6/2006 | Dvorkis et al. |
| 2006/0119805 A1 | 6/2006 | Wittenberg et al. |
| 2009/0316115 A1* | 12/2009 | Itoh ................... G02B 27/0093 353/20 |
| 2009/0323027 A1 | 12/2009 | Uchikawa |
| 2015/0092118 A1* | 4/2015 | Hada ..................... B60K 35/00 349/11 |
| 2015/0234263 A1 | 8/2015 | Yamagiwa et al. |

FOREIGN PATENT DOCUMENTS

| | | |
|---|---|---|
| JP | 2010-033012 A | 2/2010 |
| JP | 2013-073010 A | 4/2013 |
| JP | 2015-138114 A | 7/2015 |
| JP | 2015-194705 | 11/2015 |

\* cited by examiner

LIGHT SOURCE DEVICE AND IMAGE DISPLAY APPARATUS

BACKGROUND

1. Technical Field

The present disclosure relates to a light source device and an image display apparatus using the light source device, and is suitable for, for example, a light source device using a laser light source, and an image display apparatus for displaying an image produced by an image producing unit using the light source device.

2. Description of the Related Art

Development of a laser display device has been advanced that projects an image on a screen using, for example, red, blue, and green laser light. Furthermore, development of an image display apparatus has been recently advanced that displays images in a space by a virtual image optical system combining surface reflection on a glass surface (or a half mirror), a free curved surface mirror, etc.

Specifically, application to an image display apparatus called a head up display mounted on a moving body such as an automobile has been expected. For example, in a head up display mounted on an automobile, the light modulated by image data is projected toward a windshield (front glass), and its reflection light is radiated onto the eyes of an automobile driver.

This allows the automobile driver to see a virtual image on the front side of the windshield. For example, car speed, temperature, etc. are displayed as a virtual image. Recently, it has been also examined to display a navigation image or an image that alert the automobile driver to a real passer as a virtual image.

In the above head up display, a laser light source such as a semiconductor laser can be used as its light source. In such a structure, laser light scans a screen while being modulated depending on an image signal. The laser light is defused on the screen to increase an area of light radiated on the eyes of the automobile driver. This prevents the eyes from being deviated from an irradiation area even when the automobile driver moves his/her head a little, enabling the automobile driver to see a (virtual) image excellently and stably.

Using a laser light source makes it possible to, in addition to downsize an optical system for scanning laser beam on a screen, display a large virtual image regardless of a smaller main body size by combining a virtual image optical system having a large optical magnification, so that the effect of increasing the number of types of automobiles mounting thereon a head up display has been expected.

Japanese Translation of PCT Publication 2008-529069 discloses an image projection apparatus for projecting a two-dimensional color image. The image projection apparatus includes a supporter, a laser assembly for applying a plurality pieces of laser light having different wavelengths, a scanner for sweeping a pattern of a scanning line in a space existing at an action distance from the supporter, a controller for generating an image by making a selected pixel to be applied by the laser light to be seen, and an optical assembly for forming a synthesized light beam to be oriented toward the scanner by making the laser light be focused to substantially align the laser light to be collinear.

Unexamined Japanese Patent Publication No. 2015-194705 discloses head up display device 100 (projector) including laser diodes 11a to 11c, housing unit 7 (base unit 7), and heat sinks 5a and 5b, wherein the heat resistance of a first heat transfer route from laser diode 11a (11b or 11c) to housing unit 7 is larger than the heat resistance of a second heat transfer route from laser diode 11a (11b or 11c) to heat sink 5a or heat sink 5b.

SUMMARY

A light source device according to a first aspect of the present disclosure includes a laser light source, a first adjustment mechanism, a second adjustment mechanism, and a mirror. The laser light source emits laser light. The first adjustment mechanism receives the laser light incident from the laser light source, and performs an emission angle adjustment of the laser light and a focus adjustment of the laser light. The second adjustment mechanism receives the laser light incident from the first adjustment mechanism, and performs a positional adjustment of the laser light incident from the first adjustment mechanism. The mirror receives the laser light incident from the second adjustment mechanism, and emits the laser light incident from the second adjustment mechanism in a predetermined direction.

Furthermore, an image display apparatus according to the first aspect of the present disclosure includes the above light source device.

The image display apparatus according to the first aspect of the present disclosure makes it possible to perform an emission angle adjustment and a focus adjustment of laser light by the first adjustment mechanism, and perform a positional adjustment of laser light by the second adjustment mechanism, increasing a degree of freedom of optical adjustment and allowing easy adjustment.

Furthermore, the light source device according to a second aspect of the present disclosure includes a light source, a light source holding unit, and a base unit. The light source emits laser light. The light source is attached to the light source holding unit. The base unit is coupled with the light source holding unit. A protruding portion is formed on at least one of the light source holding unit and the base unit between the light source holding unit and the base unit, and the light source holding unit and the base unit are in contact with each other at the protruding portion.

Furthermore, the image display apparatus according to the second aspect of the present disclosure includes the above light source device.

According to the image display apparatus according to the second aspect of the present disclosure, a protruding portion is formed on at least one of the light source holding unit and the base unit, and the light source holding unit and the base unit are in contact with each other at the protruding portion, making it possible to suppress increase in the temperature of the light source due to transfer of the heat from the base unit to the light source holding unit.

Effects and significances of the present disclosure will be more apparent from the description of the following exemplary embodiment. Note that the following exemplary embodiment is only an example exemplifying the present disclosure, so that the present disclosure is not limited by the description of the following exemplary embodiment.

DETAILED DESCRIPTION OF EMBODIMENT

Prior to the description of an exemplary embodiment of the present disclosure, problems in a conventional configuration will be described. In a light source device and an image display apparatus, it is necessary to adjust laser light such as red laser light, blue laser light, and green laser light from a light source such as a semiconductor laser. Specifically, it is necessary to make emission angles and optical axis centers be matched and to precisely perform focus adjustment and the like such that red laser light, blue laser light, and green laser light are projected on a projection plane at one point. Imprecisely performing such various optical adjustments results in deviation in light emission points of respective colors, which can cause separation of colors and a blurred image when an image is displayed by an image display apparatus.

Furthermore, due to variations in mounting laser diodes or variations in flatness of a scanning mirror, focus position of laser beam is deviated among colors or individual variation occurs in focus position of laser beam, deteriorating displayed image. Thus, the qualities of the display images are varied in respective configurations.

Figure 24:
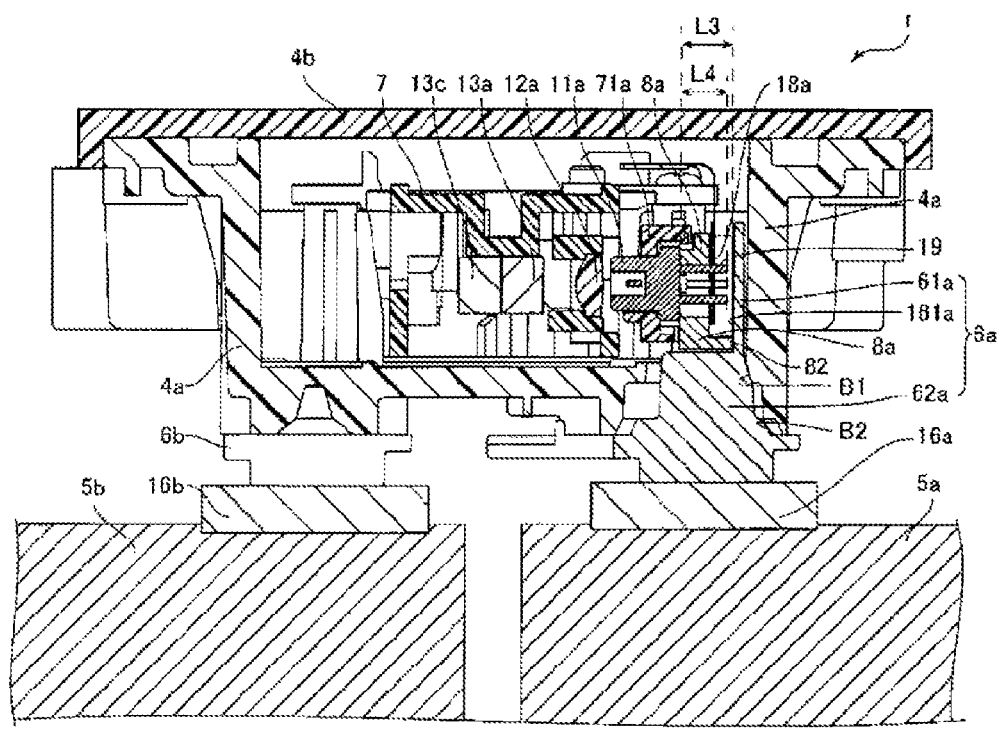
FIG. 24 is a main part cross sectional view illustrating a configuration of a conventional head up display apparatus.

On the other hand, in Unexamined Japanese Patent Publication No. 2015-194705, as illustrated in FIG. 24, attachment base unit 71a is formed of a resin or the like having a low thermal conductivity. Furthermore, laser diode (LD) plate 8a formed of metal such as aluminum (or a resin having a thermal conductivity higher than that of a normal resin) is disposed on a back surface of laser diode 11a so that heat can be transferred from the back surface of laser diode 11a toward heat sink 5a. Thus, as described above, the heat resistance from laser diode 11a to housing unit 7 is larger than the heat resistance from laser diode 11a to heat sinks 5a or 5b.

In a head up display to be mounted on a passenger automobile or the like, it is also necessary to pass an operation test under a high temperature circumstance of, for example, 80° C. However, in a case of combination of an attachment base unit made of a resin and an LD plate formed of metal such as aluminum, thermal expansion rates of the materials are different, which causes distortion or deformation, disadvantageously resulting in deviation in optical adjustment.

Furthermore, when the head up display is configured by an attachment base unit formed of a resin having a low thermal conductivity and an LD plate formed of a resin having a thermal conductivity higher than that of a normal resin, optical adjustment adjusted at its manufacturing stage may be disadvantageously deviated, or the attachment base unit itself or the LD plate itself may be disadvantageously broken under the above high temperature circumstance due to deformation or the like.

Furthermore, when anther structuring body such as a housing is attached in a heat transfer route from a laser diode to a heat sink, or when another structuring body or a part of another structuring body is used as a heat transfer route, heat resistance from external air to a laser diode is reduced, and the heat transfer route is heated by external air, requiring more large cooling capability.

Hereinafter, a light source device and an image display apparatus according to an exemplary embodiment of the present disclosure will be described with reference to the drawings.

First Exemplary Embodiment

Figure 1A:
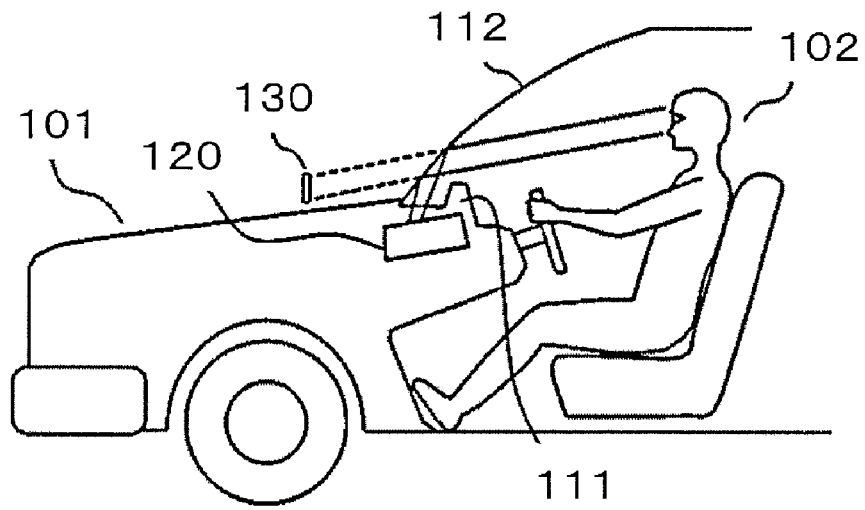
FIGS. 1A and 1B each is a diagram illustrating a using mode of an image display apparatus according to a first exemplary embodiment.
Figure 1B:
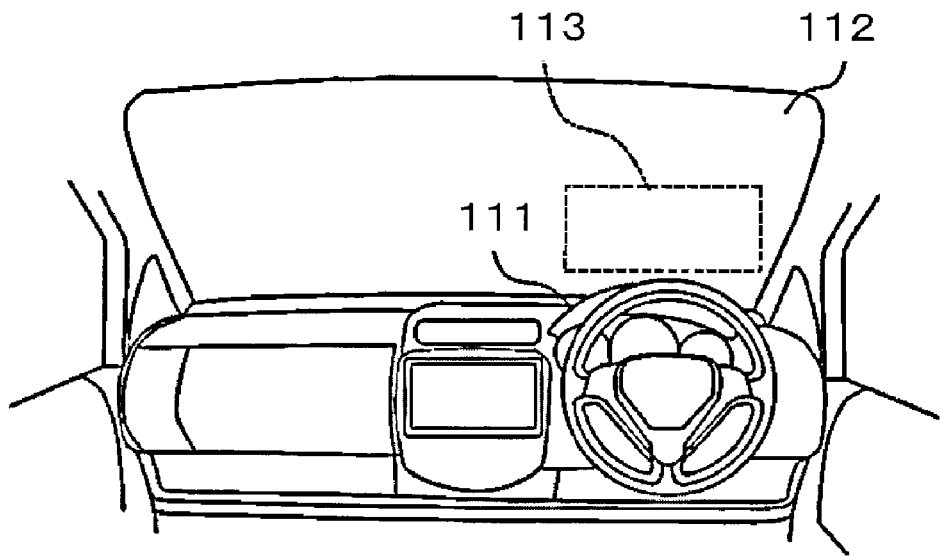

First, FIG. 1A and FIG. 1B each is a diagram illustrating a using mode of a light source device and image display apparatus 120 including the light source device mounted on image display apparatus 120 in the exemplary embodiment of the present disclosure. FIG. 1A is a diagram in which an inside of vehicle 101 is seen through from a side of vehicle 101. FIG. 1B is a diagram viewing a forward traveling direction from an inside of vehicle 101. The exemplary embodiment is an example in which the light source device of the present disclosure is applied to a head up display for a vehicle.

As illustrated in FIG. 1A, image display apparatus 120 is provided inside dashboard 111 of vehicle 101. As illustrated in FIG. 1A and FIG. 1B, image display apparatus 120 projects laser light modulated by an image signal in projection area 113 disposed on the driving seat side and on a lower side of windshield 112.

The laser light is reflected by projection area 113, and radiated on a landscape-oriented area (eye box area) around the positions of the eyes of automobile driver 102. Consequently, predetermined image 130 is displayed in a forward eyesight of automobile driver 102 as a virtual image. Automobile driver 102 can see image 130, which is a virtual image, overlapped with a landscape in front of windshield 112. That is, image display apparatus 120 makes image 130 that is a virtual image be imaged on a space in front of projection area 113 of windshield 112.

Figure 2:
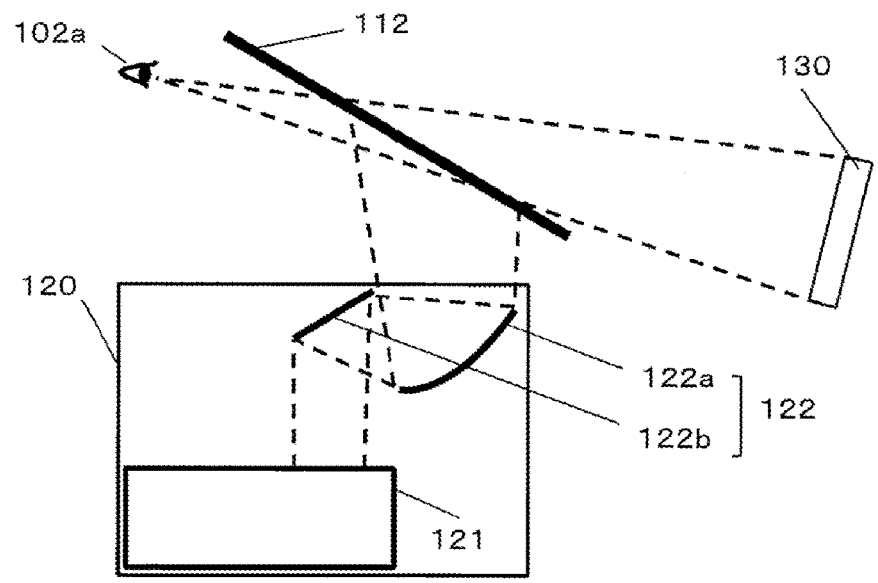
FIG. 2 is a diagram illustrating a schematic configuration of the image display apparatus according to the first exemplary embodiment.

FIG. 2 is a schematic view illustrating an inside configuration of image display apparatus 120. As illustrated in FIG. 2, image display apparatus 120 includes optical module 121 (light source device), and virtual image optical system 122.

Figure 3:
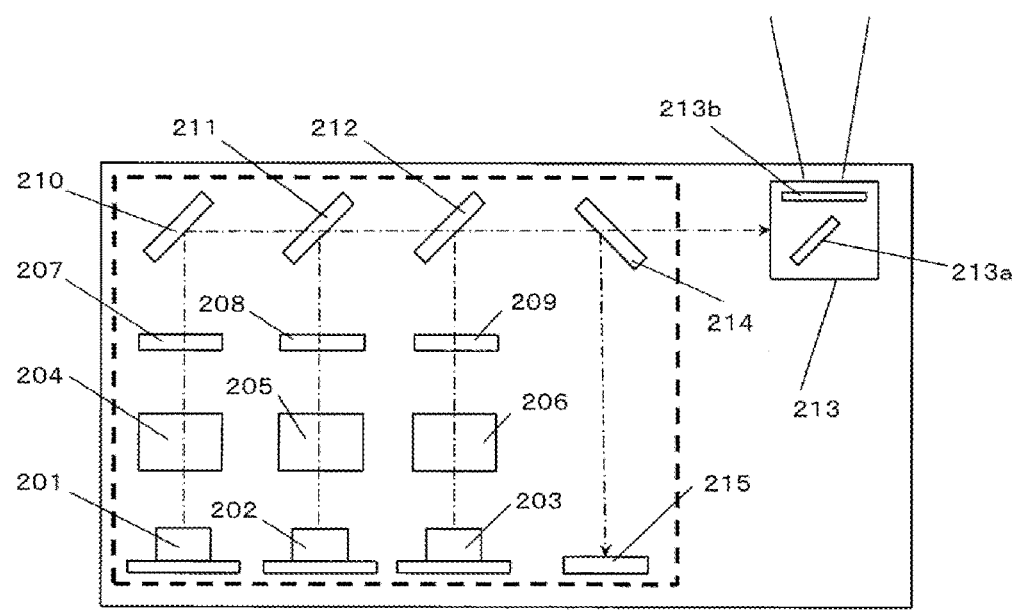
FIG. 3 is a schematic view illustrating a schematic configuration of an optical module (light source device) according to the first exemplary embodiment.

FIG. 3 is a schematic view illustrating an inside configuration of optical module 121. Optical module 121 includes laser diode (hereinafter, referred to as LD) 201, LD 202, and LD 203 as a laser light source, and emits laser light modulated by an image signal (not shown). In the present disclosure, LD 201 is a semiconductor laser light source for blue color, LD 202 is a semiconductor laser light source for green color, and LD 203 is a semiconductor laser light source for red color.

The laser light emitted from each of the LDs is formed as a laser beam having substantially an identical axis via first dichroic mirror 210, second dichroic mirror 211, and third dichroic mirror 212, and enters scanning unit 213. Then, the laser beam is introduced into the virtual image optical system 122 illustrated in FIG. 2 via scanning mirror 213a and screen driving part 213b for three-dimensional display in scanning unit 213.

In FIG. 3, 204 denotes a first collimator module, 205 denotes a second collimator module, 206 denotes a third collimator module, 207 denotes a first shift module, 208 denotes a second shift module, and 209 denotes a third shift module. The specific configuration of each of first collimator module 204, second collimator module 205, third collimator module 206, first shift module 207, second shift module 208, and third shift module 209 will be described later.

214 denotes a spectroscopic mirror. About 95% of the laser light from each LD passes through the spectroscopic mirror and about 5% of the laser light is reflected by the spectroscopic mirror. The about 5% of the laser light, which has reflected, is introduced into brightness monitor 215 disposed ahead of spectroscopic mirror 214, and used for brightness adjustment and the like of the image display apparatus.

Scanning mirror 213a has two rotation shafts, which are a shaft reciprocating at a resonance frequency of about 20 kHz (called high speed shaft for descriptive purposes), and a shaft reciprocating at frame rate of image (60 kHz in the exemplary embodiment) (called low speed shaft for descriptive purposes).

Returning to FIG. 2, virtual image optical system 122 has curved reflection surface 122a and flat reflection surface 122b. The laser light radiated from optical module 121 is reflected by virtual image optical system 122 toward windshield 112. The laser light reflected by windshield 112 is radiated on eye 102a of automobile driver 102. The optical system and virtual image optical system 122 of optical module 121 are set such that virtual image 130 having a predetermined size is displayed on the front side of windshield 112.

Note that, although the exemplary embodiment employs a windshield type head up display for observing virtual image through a windshield, the exemplary embodiment may employ so called combiner type head up display for observing a virtual image through an optical component called a combiner.

Furthermore, in the exemplary embodiment, scanning mirror 213a has an optical configuration using a reciprocating mirror with so called a micro electro-mechanical system (MEMS) structure by using effects of applying distortion by a piezoelectric material, electromagnetic force, and static electricity, but a polygon mirror or a galvanic mirror can be used as long as laser light is scanned.

Figure 4:
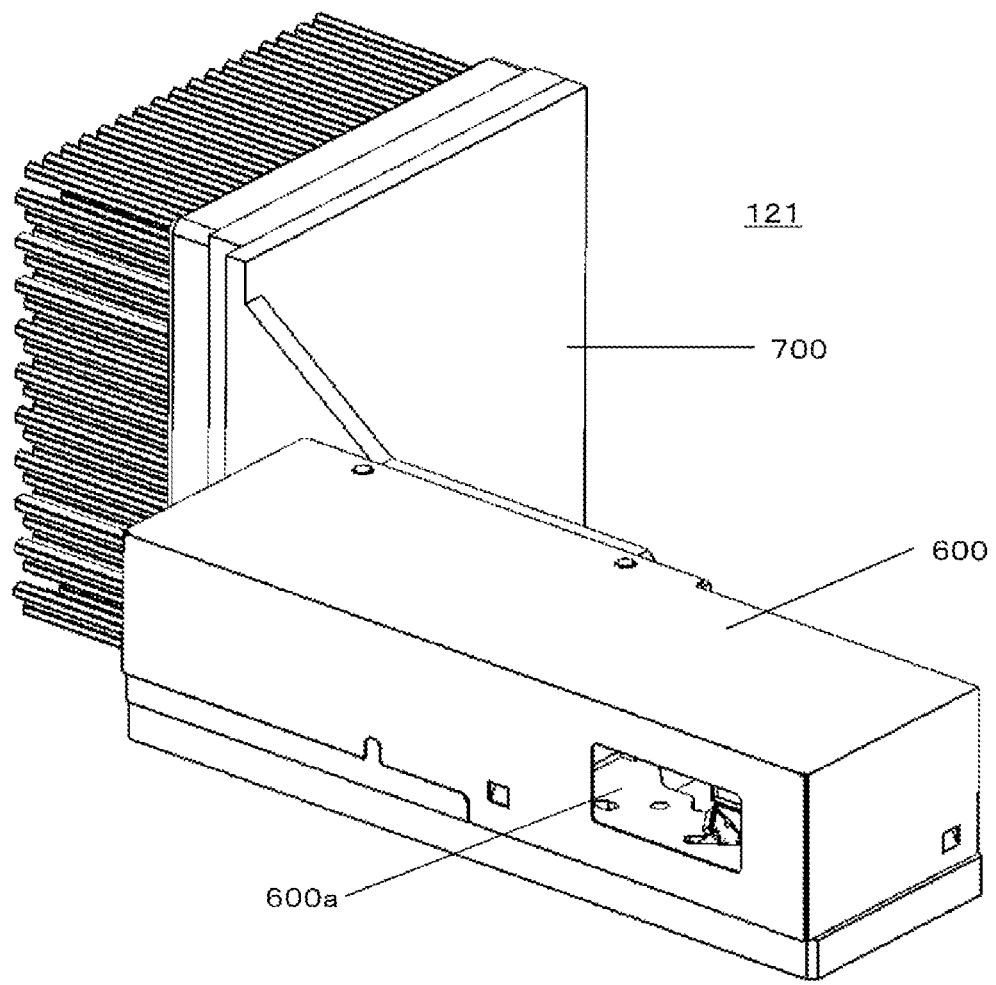
FIG. 4 is a perspective view illustrating an appearance of the optical module (light source device) according to the first exemplary embodiment.

FIG. 4 illustrates an appearance of optical module 121. In FIG. 4, 600 denotes a shield cover, and projection window 600a is formed at a part of shield cover 600. 700 denotes a cooling unit for radiating heat generated in optical module 121. Cooling unit 700 includes a Peltier element, a heat sink, etc.

Figure 5:
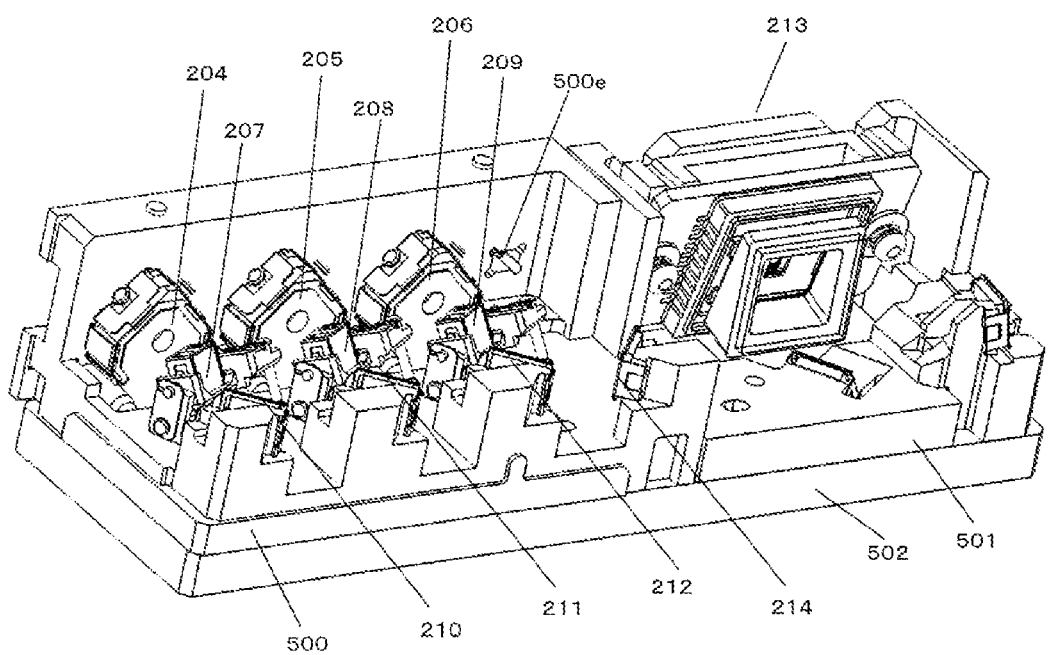
FIG. 5 is a perspective view illustrating an inside of the optical module (light source device) according to the first exemplary embodiment.

FIG. 5 is a perspective view illustrating an inner configuration of optical module 121, and in FIG. 5, 500 denotes an optical base unit on which a portion corresponding to the portion surrounded by a broken line in FIG. 3 is mounted, 501 denotes a scanning base unit on which scanning unit 213 is mounted, 502 is a combining base unit on which optical base unit 500 and the scanning base unit 501 are mounted. 500e is an opening formed to introduce the laser light for detecting brightness dispersed by spectroscopic mirror 214 into brightness monitor 215 (see FIG. 3).

Figure 6:
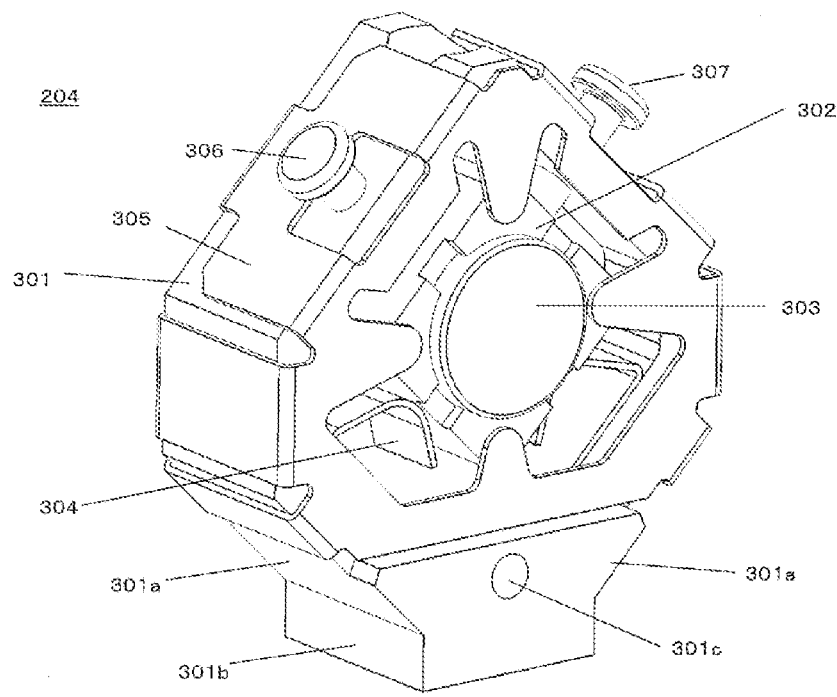
FIG. 6 is a perspective view illustrating an appearance of a collimator module in the optical module (light source device) according to the first exemplary embodiment.
Figure 7:
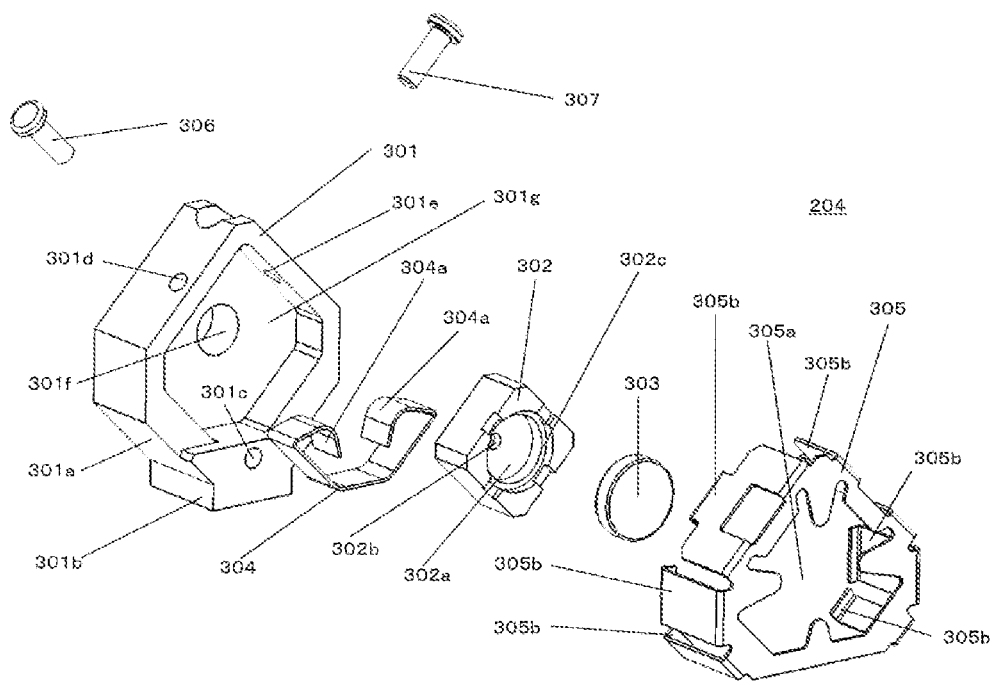
FIG. 7 is an exploded perspective view illustrating a configuration of the collimator module in the optical module (light source device) according to the first exemplary embodiment.

FIG. 6 illustrates an appearance of the collimator module, and FIG. 7 illustrates an exploded perspective view of the collimator module. The structures of first collimator module 204, second collimator module 205, and third collimator module 206 are similar, so that description will be made on the basis of first collimator module 204 as their representative.

In FIG. 6 and FIG. 7, 301 denotes a focus slider, 301a denotes rail contact portions that contact with respective focus rails (see 308, 309 of FIG. 8), 301b denotes a projection portion, 301c denotes a screw hole formed in the projection portion 301b, 301d and 301e are screw holes in which respective emission angle adjustment screws 306, 307 are inserted, 301f is an opening through which laser light from each LD passes, and 301g is a recessed portion.

302 is a collimator holder and includes recessed portion 302a, opening 302b through which laser light from each LD passes, and step portion 302c at which collimator lens 303 is positioned, and collimator lens 303 is bonded and fixed to step portion 302c. Collimator holder 302 is housed in recessed portion 301g formed in focus slider 301, and when housed, collimator holder 302 is pressed by pressing portions 304a of collimator shift spring 304 which is also housed in recessed portion 301g, to be disposed without backlash.

305 is a collimator cover made of metal, and collimator cover 305 has an opening 305a at the center, and further includes a plurality of holding clicks 305b around opening 305a, and is attached to focus slider 301 to cover collimator holder 302 and collimator shift spring 304 housed in recessed portion 301g of focus slider 301.

The laser light emitted from the LD is emitted in the direction in which an emission point of the LD and an optical center of the collimator lens are connected. Consequently, the emission angle of the laser light can be adjusted by rotating emission angle adjustment screws 306, 307 to press collimator holder 302 by respective tips of screws to change the position of collimator holder 302.

Figure 8:
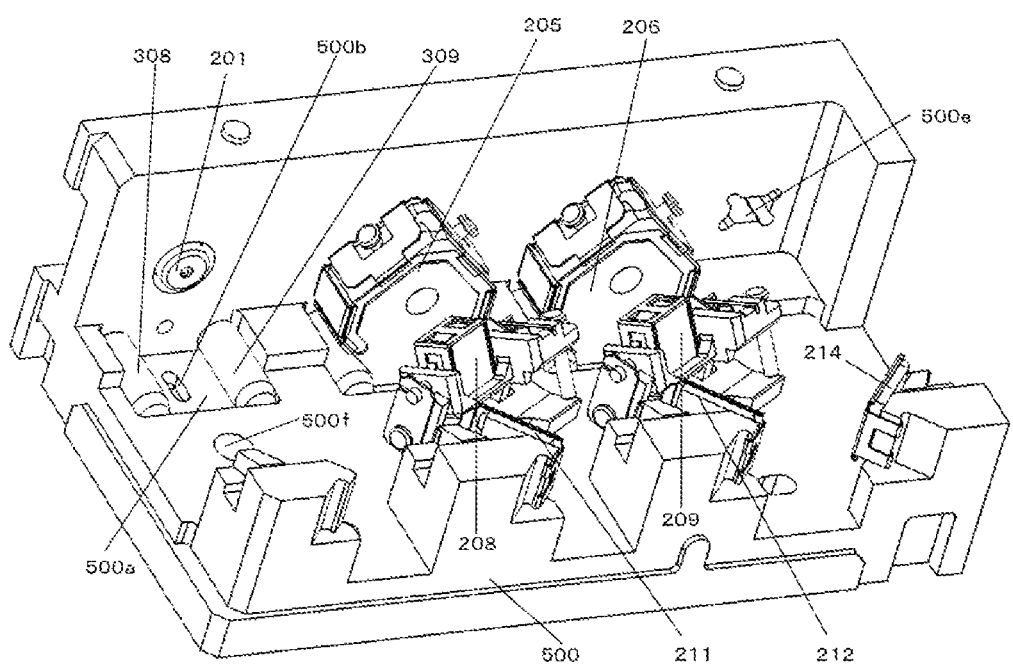
FIG. 8 is a perspective view illustrating a part of an inside configuration of the optical module (light source device) according to the first exemplary embodiment.

FIG. 8 shows a state where first collimator module 204, first shift module 207, and first dichroic mirror 210 are removed from the configuration illustrated in FIG. 5. As illustrated in FIG. 8, recessed portion 500a for receiving first collimator module 204 is formed on optical base unit 500, and adjustment hole 500b having a long round shape is formed at the bottom of recessed portion 500a.

To recessed portion 500a, focus rail 308 and focus rail 309 are disposed. Note that a recessed portion and an adjustment hole are formed also under each of second collimator module 205 and third collimator module 206, and focus rails are also disposed in each of the recessed portions.

Figure 9A:
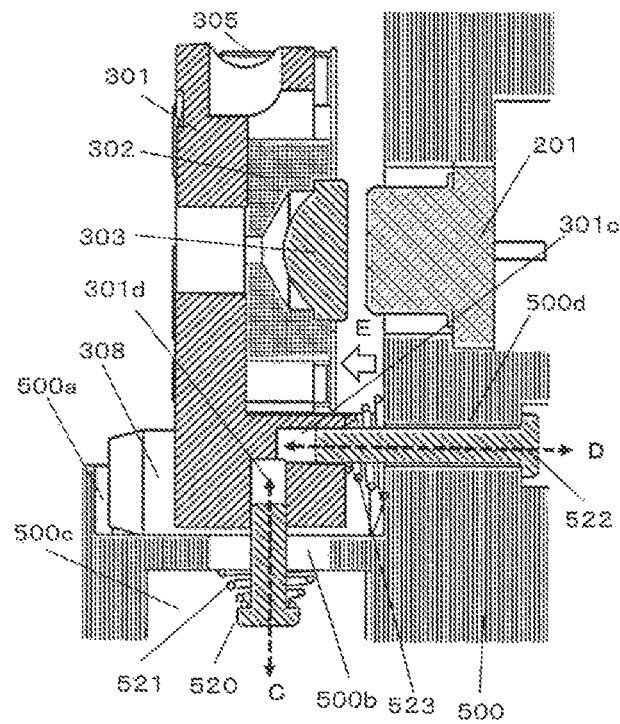
FIGS. 9A and 9B each is a cross sectional view illustrating an attachment state of the collimator module in the optical module (light source device) according to the first exemplary embodiment.
Figure 9B:
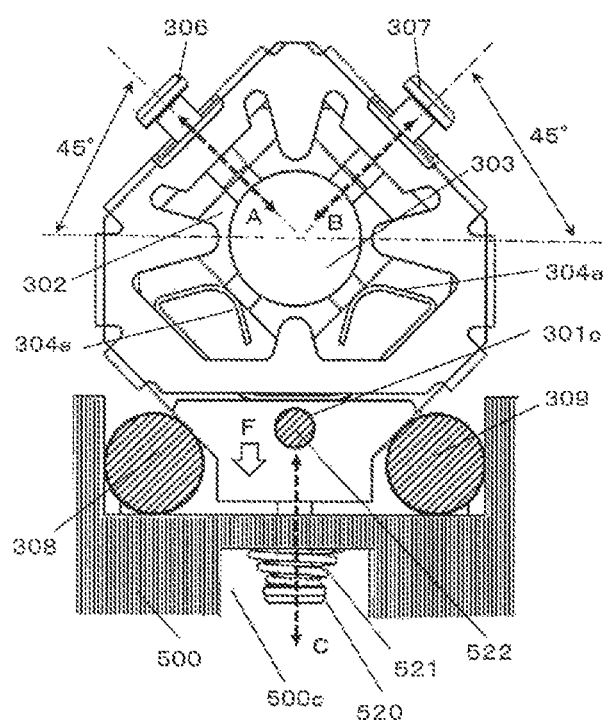

FIG. 9A and FIG. 9B each are a cross sectional view illustrating first collimator module 204 embedded in optical base unit 500. As illustrated in FIG. 9A and FIG. 9B, to first collimator module 204, screw 520 and spring 521 are attached through adjustment hole 500b from recessed portion 500c formed on the back-surface side of optical base unit 500.

Then, first collimator module 204 is pulled in the direction of arrow F (see FIG. 9B) by spring 521, and rail contact portions 301a of first collimator module 204 is in a state of being pressed to focus rail 308 and focus rail 309. Consequently, first collimator module 204 is attached to optical base unit 500 without backlash.

Furthermore, to first collimator module 204, focus adjustment screw 522 inserted from screw hole 500d formed in the back surface of optical base unit 500 is attached. Spring 523 is disposed between the back surface of optical base unit 500 and first collimator module 204 to press first collimator module 204 in the direction of arrow E, which allows first collimator module 204 to slide on focus rail 308 and focus rail 309 without backlash depending on rotation of focus adjustment screw 522 for positional adjustment in the direction of arrow D, making it possible to perform focus adjustment in the optical axis direction of collimator lens 303.

Note that, as illustrated in FIG. 9B, emission angle adjustment screws 306 and 307 are inclined by 45° C. in the upper direction with respect to the level. Accordingly, as illustrated in FIG. 5, the adjustment can be performed by easily rotating the adjustment screws with a screwdriver or the like even when first collimator module 204, second collimator module 205, and third collimator module 206 are closely disposed.

Figure 10:
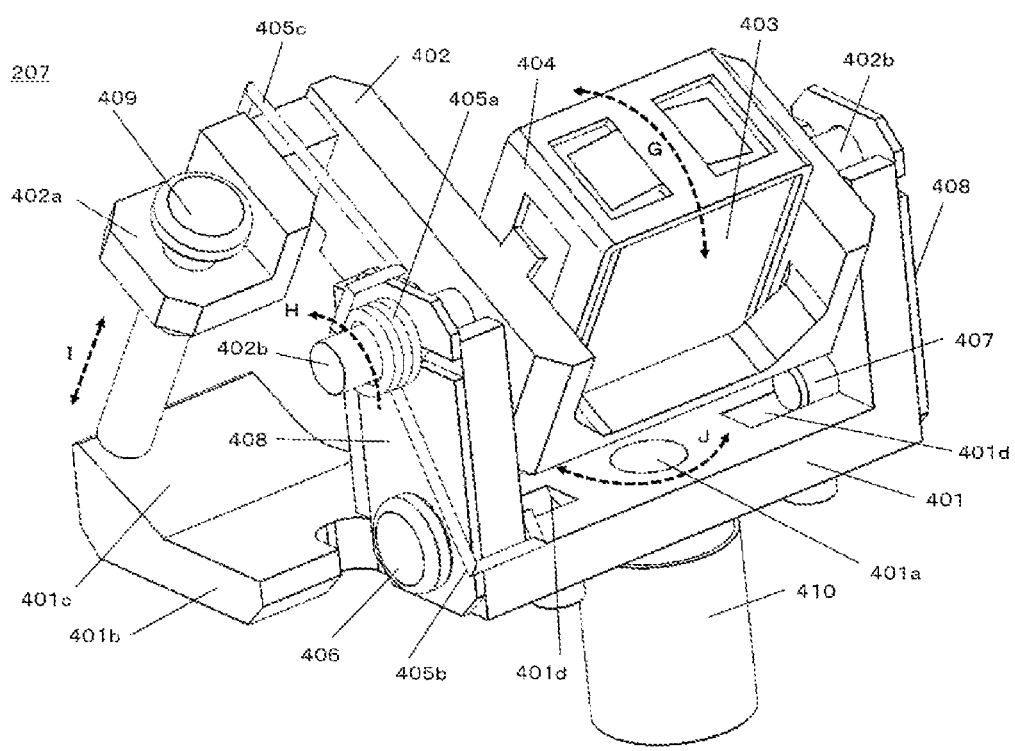
FIG. 10 is a perspective view illustrating an appearance of a shift module in the optical module (light source device) according to the first exemplary embodiment.
Figure 11:
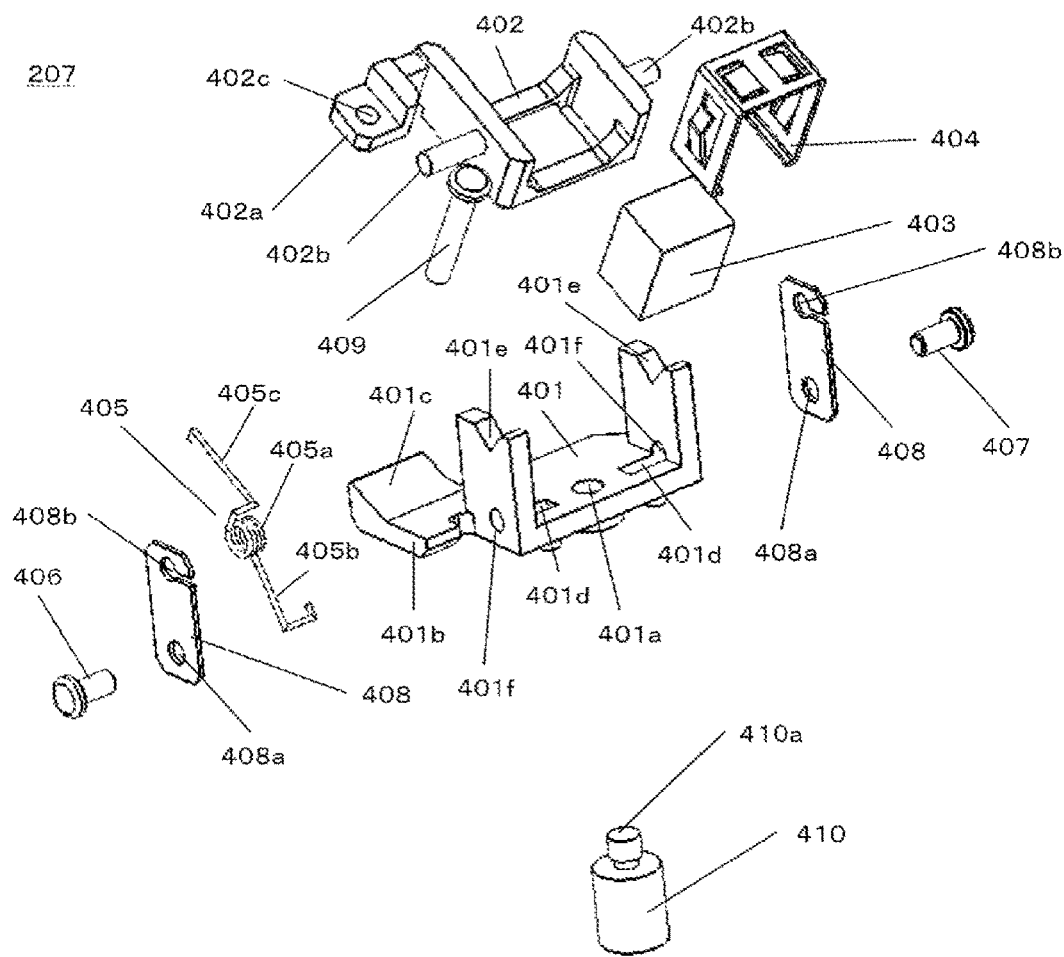
FIG. 11 is an exploded perspective view illustrating a configuration of the shift module in the optical module (light source device) according to the first exemplary embodiment.

FIG. 10 illustrates an appearance of first shift module 207, and FIG. 11 illustrates an exploded perspective view of first shift module 207. Note that configurations of first shift module 207, second shift module 208, and third shift module 209 are similar, so that description will be made on the basis of first shift module 207 as their representative.

In FIG. 10 and FIG. 11, 401 is rotary base, 401a is a hole in which a tip 410a of rotation shaft 410 is inserted, 401b is an extending portion having reception portion 401c for receiving a tip of angle adjustment screw 409, 401d are groove portions in which fixation screws 406, 407 are entered, 401e is a bearing, and 401f are screw holes to which fixation screws 406, 407 are attached.

402 is a movable table, and shift glass 403 formed by parallel flat plates is attached to movable table 402 by shift glass cover 404 made of metal. 402a denotes an extending portion having screw hole 402c to which angle adjustment screw 409 is attached, and 402b denotes a rotation shaft and placed at bearing 401e of the rotary base.

408 are bearing plates for attaching movable table 402 to rotary base 401. In bearing plates 408, holes 408a for fixation screw 406, 407 are formed, and bearing holes 408b for holding rotation shafts 402b of movable table 402 are formed.

As illustrated in FIG. 10, in a state where rotation shafts 402b of movable table 402 is placed on respective bearing portions 401e of rotary base 401, rotation shaft 402b of movable table 402 is made to pass through bearing hole 408b of bearing plate 408, and bearing plate 408 is fixed by fixation screw 406. Likewise, in the opposite side, bearing plate 408 is fixed by fixation screw 407.

Furthermore, on the side of fixation screw 406, winding portion 405a of spring member 405 is made to be passed through by rotation shaft 402b of movable table 402, and hook portion 405b hooks on rotary base 401 as illustrated in FIG. 10, and hook portion 405c hooks on movable table 402. This makes movable table 402 be biased in the direction of arrow H in FIG. 10, preventing backlash of movable table 402.

Then, making angle adjustment screw 409 rotate in the direction of arrow I enables movable table 402 to rotate about rotation shaft 402b to adjust the inclination of shift glass 403 in the direction of arrow G. Furthermore, making rotary base 401 rotate in the direction of arrow J with respect to rotation shaft 410 makes it possible to perform optical axis adjustment of laser light.

Returning to FIG. 8, first shift module 207 is attached to opening 500f formed in optical base unit 500. Although not shown in FIG. 8, second shift module 208 and third shift module 209 are also attached to respective openings formed in optical base unit 500 in the same manner.

Figure 12:
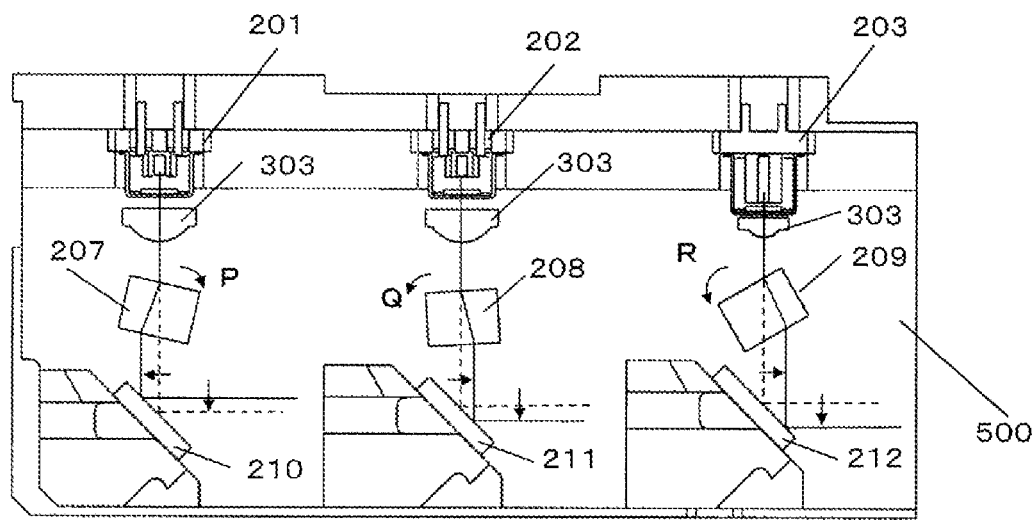
FIG. 12 is a schematic view illustrating operations of the shift modules in the optical module (light source device) according to the first exemplary embodiment.

FIG. 12 is a schematic view illustrating optical axis adjustment of the laser light. When shift glass 403 is absence, (or the plane of shift glass is in parallel with the surface perpendicular to the optical axis), the optical axis of the laser sight is oriented as illustrated by a broken line. When movable table 402 rotates in the direction of arrow P about rotation shafts 402b, the optical axis moves as illustrated by a solid line. On the other hand, when movable table 402 rotates in the direction of arrow Q or arrow R about rotation shafts 402b, the optical axis of the laser light moves in the direction opposite to the direction in the former case.

Figure 13:
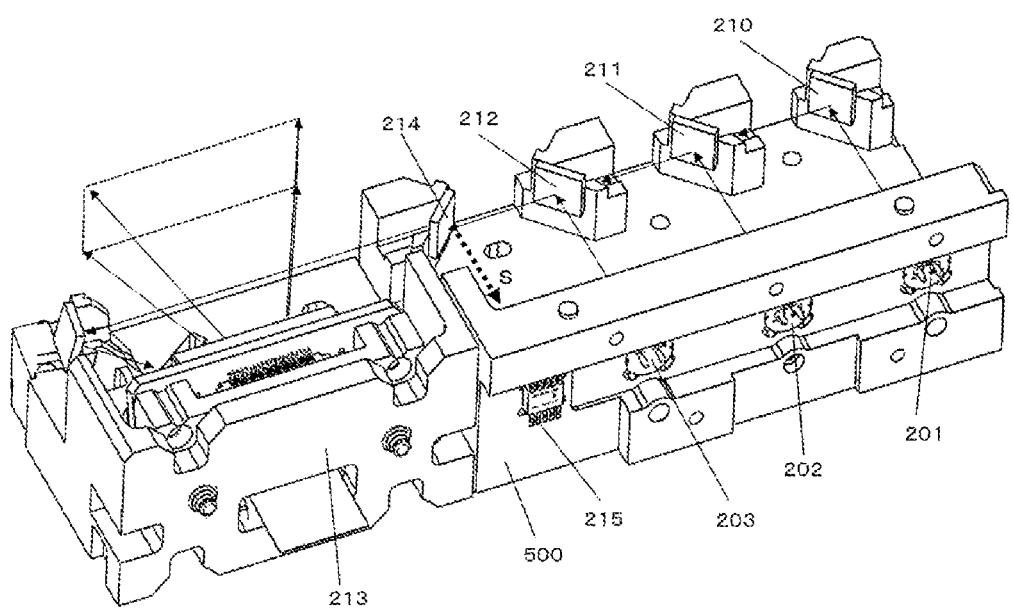
FIG. 13 is a perspective view illustrating a portion of the configuration of the optical module (light source device) according to the first exemplary embodiment.

FIG. 13 is an appearance illustrating a portion on the back surface of the optical module. Brightness monitor 215 is disposed on the surface identical to the surface on which LD 201, LD 202, and LD 203 are attached. As described above, about 5% of laser light is dispersed in the direction of arrow S by spectroscopic mirror 214 to reach brightness monitor 215. Such an arrangement allows various wirings for input and output to be connected from the same surface side, making it easy to handle the wirings.

The configuration of the optical source device and image display apparatus of the exemplary embodiment has been described above, and procedures of adjustments of optical module 121 will subsequently be described.

(1) Adjustment of Emission Angle and Rough Adjustment of Focus of Emission Laser Light a. Attaching the optical module to an emission angle adjustment jig (not shown).

b. Rotating emission angle adjustment screw 306 and emission angel adjustment screw 307 of first collimator module 204 for rough adjustment by using an auto collimator so that the emission laser light enters in an observable range of a monitor.

c. Rotating focus adjustment screw 522 of first collimator module 204 to make a spot size of the laser light on the monitor minimum.

d. Likewise, performing adjustment of the emission angle and rough adjustment of focus of the emission laser light also to second collimator module 205 and third collimator module 206 so that beam spots of respective colors of red, blue, and green overlap at one point.

(2) Beam Position Rough Adjustment of Emission Laser Light a. Attaching the optical module to a beam position adjustment jig (not shown).

b. Rotating angle adjustment screw 409 and rotary base 401 itself of first shift module 207 to adjust the angle of shift glass 403 so that the emission laser light comes at a predetermined position. Likewise, the angle of the shift glass is adjusted also to second shift module 208 and third shift module 209 so that beam spots of respective colors of red, blue, and green overlap at one point.

(3) Fine Adjustment of Focus of Emission Laser Light a. Setting a beam profiler at a predetermined observation distance (not shown).

b. Adjusting first collimator module 204, second collimator module 205, and third collimator module 206 to perform fine adjustment of focus so that beam width (short axis) of beam intensity $1/e^2$ (13.5%) becomes minimum.

c. Moving the shift glass of each of first shift module 207, second shift module 208, and third shift module 209 to adjust the beam of the emission laser light comes to the center of scanning mirror 213*a* (beam position adjustment).

In this manner, each adjustment is completed. In the above procedure, description abut adjustment of scanning unit 213 is omitted.

Figure 14A:
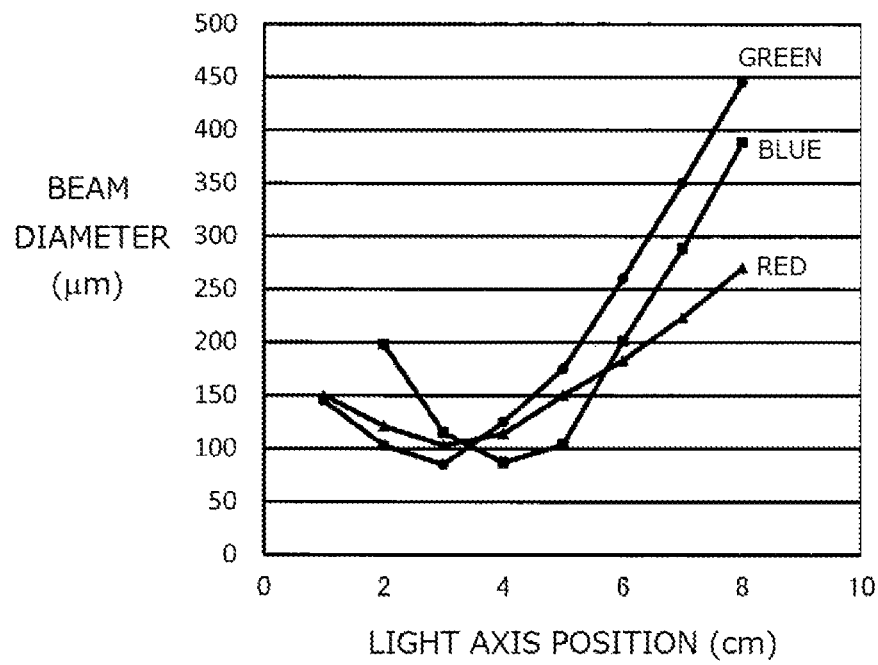
FIG. 14A is a chart illustrating relationship between light axis position and beam diameter with regard to red light, green light, and blue light in a conventional configuration.
Figure 14B:
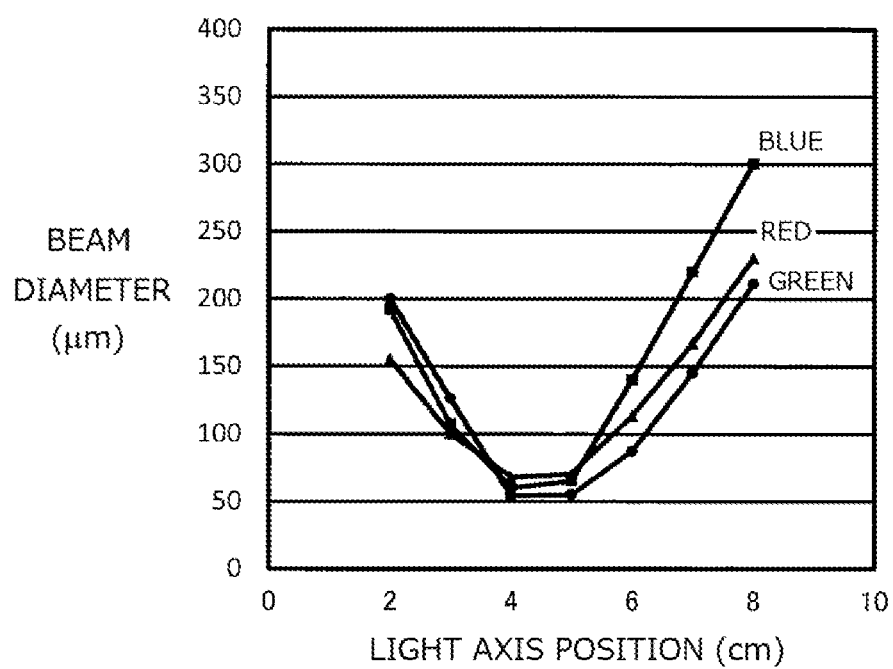
FIG. 14B is a chart illustrating 1 relationship between light axis position and beam diameter with regard to red light, green light, and blue light in the first exemplary embodiment.

FIG. 14A is a chart illustrating relationship between light axis position (a position along the optical axis direction) and beam diameter with regard to red light, green light, and blue light in the case where optical adjustment is performed in the conventional configuration, and FIG. 14B illustrates relationship between light axis position and beam diameter with regard to red light, green light, and blue light in the case where optical adjustment is performed in the configuration described in the exemplary embodiment. Note that the conventional configuration is a case where a laser diode and a collimator lens are made to be a module unit first and thereafter installed in an optical module.

As illustrated in FIG. 14A, the condensing positions (a condensing position: a position at which the beam diameter is smallest) of the laser light emitted from the optical module are substantially same positions in green light and red light, but the condensing position in blue light is retreated about 1 cm. Furthermore, as shown in FIG. 14A, variations in light beam diameters at the condensing positions occur, and variations in focus positions among optical modules also occur.

In contrast, as illustrated in FIG. 14B, in the case where the adjustment mechanism in the exemplary embodiment is employed, the condensing positions of respective light are substantially same, and the light beam diameters of respective light are within a range from about 50 μm to about 70 μm, and individual variations among optical modules can be made small.

The above results reveal that the first exemplary embodiment makes it possible to eliminate blurring of the displayed image and the phenomenon that only a specific color is blurred due to focus position deviation among colors.

Second Exemplary Embodiment

A second exemplary embodiment is different from the first exemplary embodiment in the configuration of optical module 121 (light source device). Other configurations of the second exemplary embodiment are the same as those of the first exemplary embodiment. Hereinafter the configuration of optical module 121 of the second exemplary embodiment will be described with reference to the drawings. The description about the configurations same as those of the first exemplary embodiment is omitted.

Figure 15:
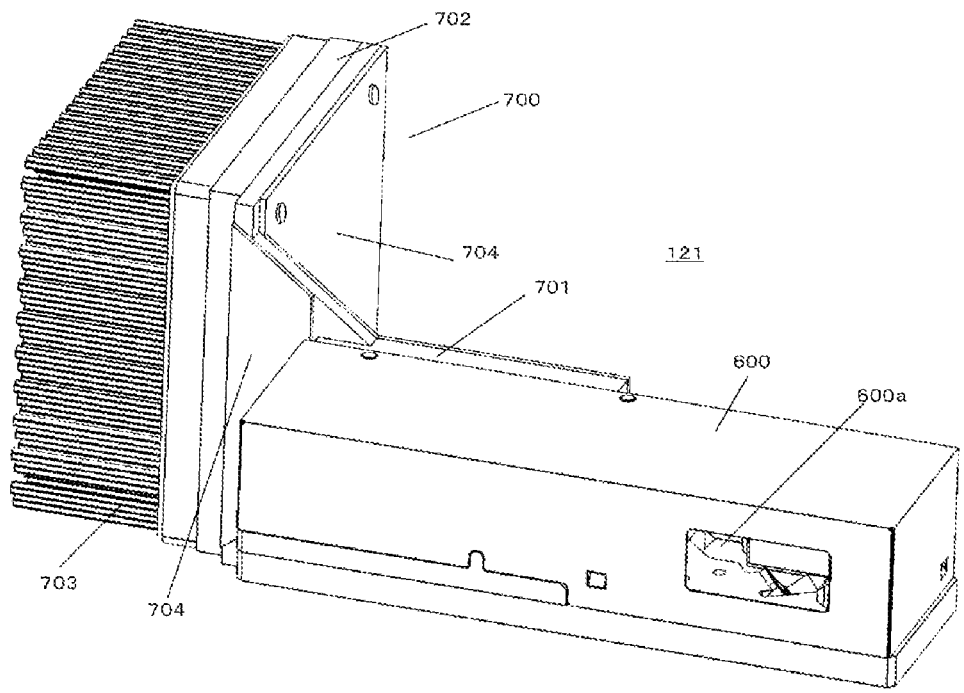
FIG. 15 is a perspective view illustrating an appearance of an optical module (light source device) according to a second exemplary embodiment.
Figure 16:
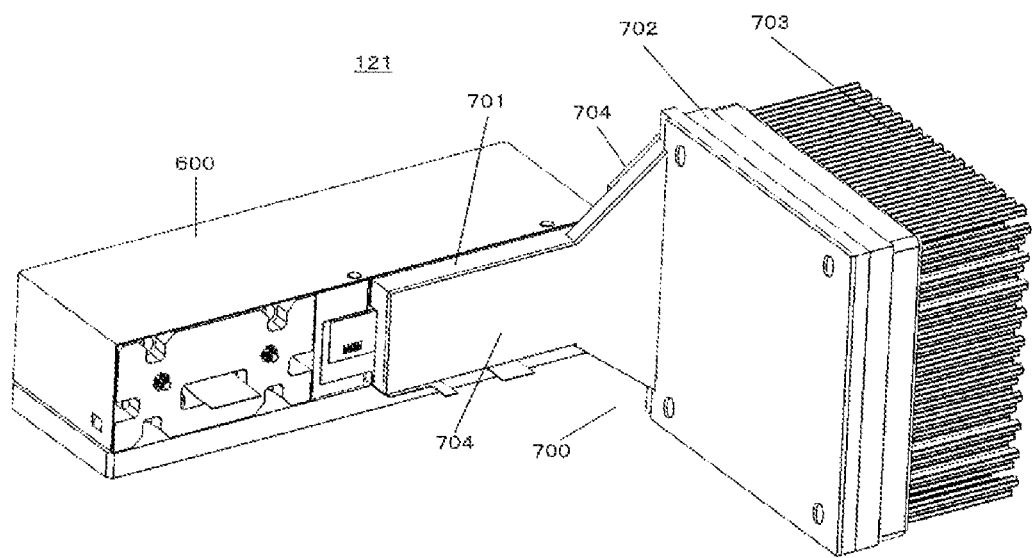
FIG. 16 is a perspective view illustrating an appearance of the optical module (light source device) according to the second exemplary embodiment.

FIG. 15 and FIG. 16 each illustrates an appearance of optical module 121. FIG. 15 is a perspective view of optical module 121 as viewed from its front side, and FIG. 16 is a perspective view of optical module 121 as viewed from its back side.

In FIG. 15 and FIG. 16, 600 denotes a shield cover, and a projection window 600*a* for projecting laser light is formed at a portion of the shield cover 600. 700 denotes a cooling unit (cooling unit) for radiating the heat generated in optical module 121. Cooling unit 700 includes heat sink 701, Peltier element 702, and radiation fin 703. 704 denotes an insulator as a heat insulating material for preventing heat absorption from the external air, and is attached to the surface of heat sink 701.

Figure 17:
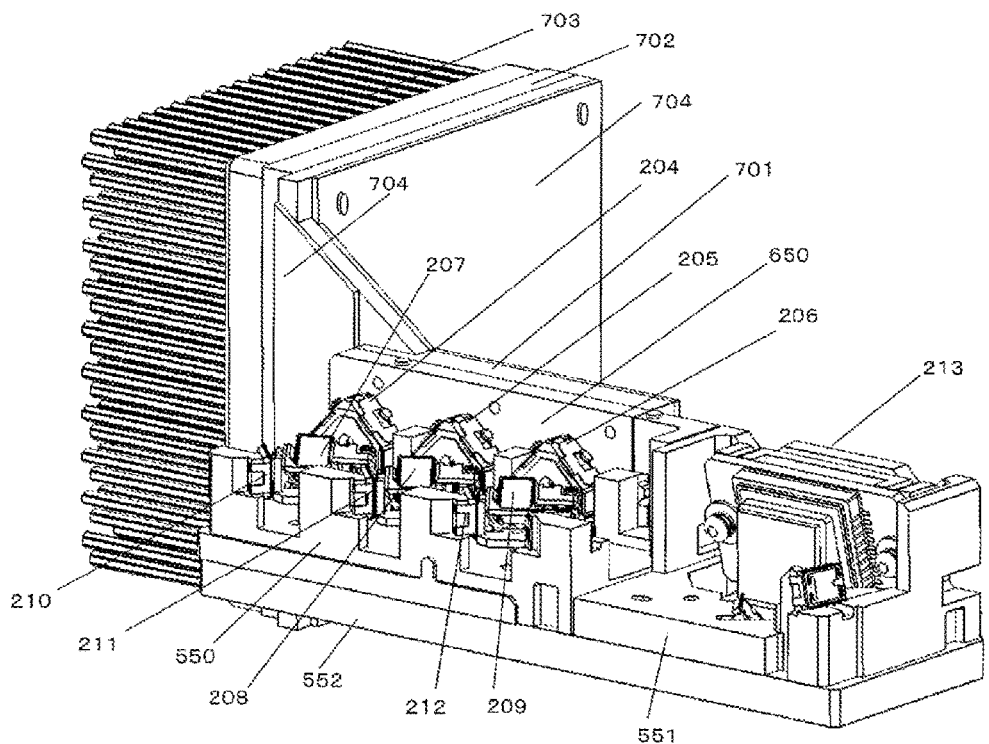
FIG. 17 is a perspective view illustrating a state where a shield cover is removed from the optical module (light source device) according to the second exemplary embodiment.

FIG. 17 is a perspective view illustrating the inside of optical module 121, and illustrates a state where shield cover 600 is removed from the state of FIG. 15. In FIG. 17, 550 denotes an optical base unit (base unit) on which a portion corresponding to the rectangular portion surrounded by a broken line in FIG. 3 is mounted, 551 denotes a scanning base unit on which scanning unit 213 is mounted, and 552 denotes a combining base unit on which optical base unit 550 and scanning base unit 551 are mounted.

Figure 18:
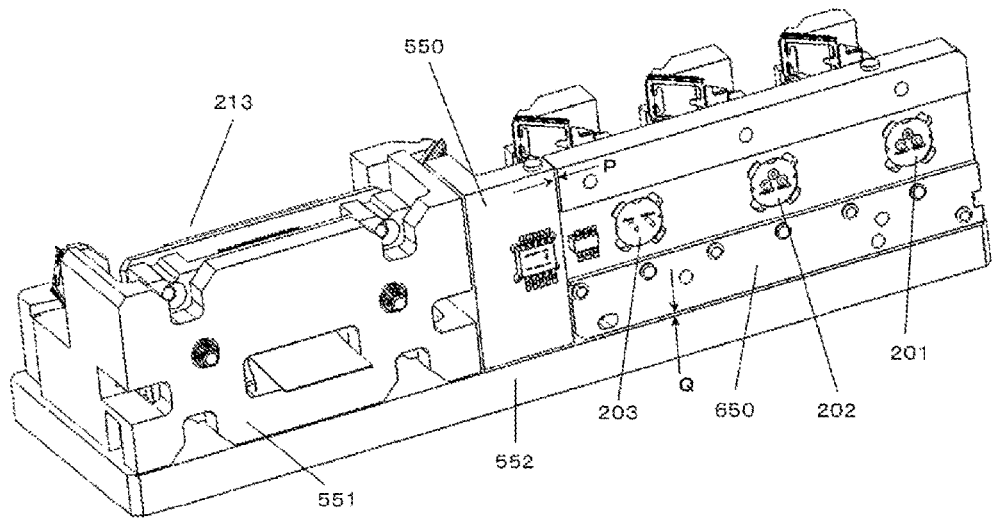
FIG. 18 is a perspective view illustrating a state where the shield cover is removed from the optical module (light source device) according to the second exemplary embodiment.

FIG. 18 is a perspective view illustrating optical module 121 illustrated in FIG. 17 from its back side, and illustrates a state where cooling unit 700 is removed. In FIG. 18, 650 denotes an LD holder (light source holding unit), and is attached on the back surface of optical base unit 550. As illustrated above, LD 201, LD 202, and LD 203, which are laser diodes as light sources, are attached to LD holder 650. In FIG. 18, a flexible substrate to which a terminal of each of LD 201, LD 202, and LD 203 are electrically connected is omitted.

Furthermore, in FIG. 18, a narrow gap exists between the side surface (nearer to scanning unit 213) of LD holder 650 and optical base unit 550 (P in FIG. 18), and a narrow gap also exists between the bottom surface of LD holder 650 and the upper surface of optical base unit 550 (Q in FIG. 18) to prevent contact. This configuration makes heat in optical base unit 550 be less likely to transfer from the side surface of LD holder 650 and the bottom surface of LD holder 650.

Figure 19:
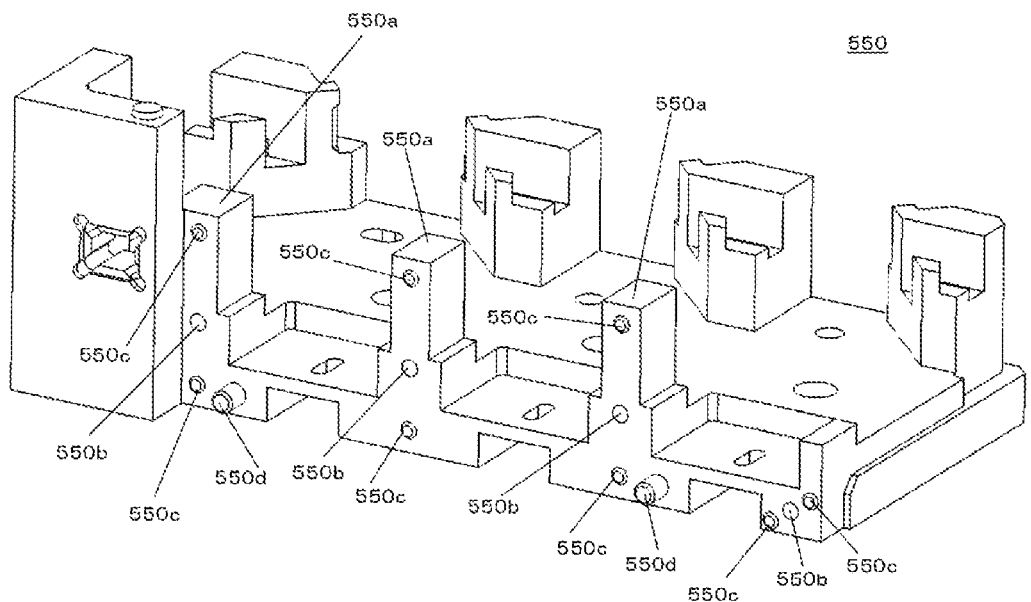
FIG. 19 is a perspective view illustrating an appearance of an optical base unit in the optical module (light source device) according to the second exemplary embodiment.
Figure 20:
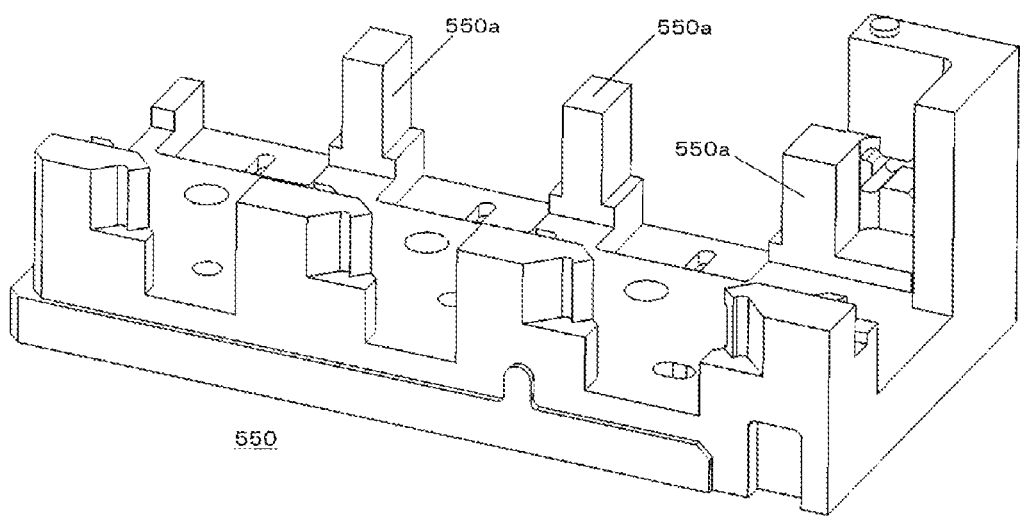
FIG. 20 is a perspective view illustrating an appearance of the optical base unit in the optical module (light source device) according to the second exemplary embodiment.

FIG. 19 and FIG. 20 each is a perspective view illustrating an appearance of optical base unit 550, and FIG. 19 is a perspective view of optical base unit 550 as viewed from its back side, and FIG. 20 is a perspective view of optical base unit 550 as viewed from its front side. Optical base unit 550 is made of aluminum die-casting. In each of FIG. 19 and FIG. 20, 550a denotes a columnar portion that is integrally formed with optical base unit 550, and screw hole 550b for attaching thereto LD holder 650 is formed in columnar portion 550a. Furthermore, protruding portions 550c having a conic shape having a trapezoidal shape in its cross section are formed on the back surface of optical base unit 550 and columnar portions 550a, and LD holder 650 is attached to the optical base unit 550 to contact at the tips of respective protruding portions 550c. 550d denotes a positioning pin for positioning LD holder 650.

In this manner, the exemplary embodiment provides areas having a substance having a high heat resistance such as air between LD holder 650 that is a light source holding unit and optical base unit 550 that is a base unit by providing protruding portions 550c.

In the above description, protruding portions 550c has a conic shape having a trapezoidal shape in its cross section, but this is not limited thereto, and the protruding portions 550c may have various shapes such as pyramid, cone, or hemispherical shape in its cross section. Furthermore, the number of protruding portions 550c can be appropriately changed.

Figure 21A:
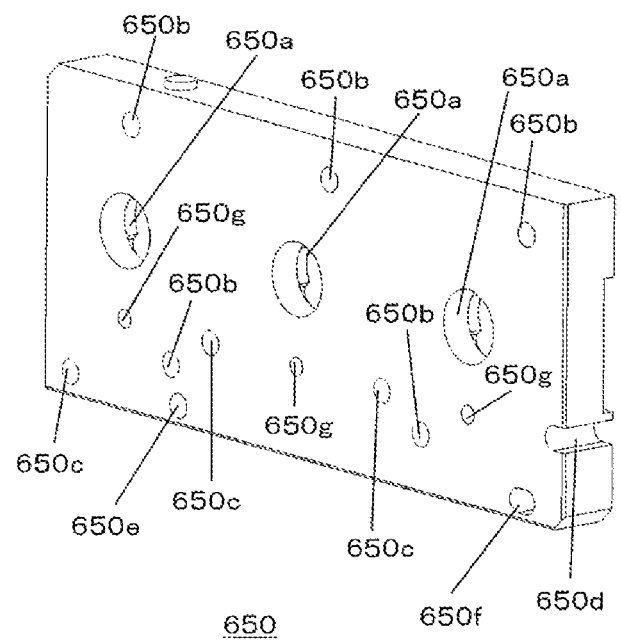
FIGS. 21A and 21B each is a perspective view illustrating an appearance of an LD holder in the optical module (light source device) according to the second exemplary embodiment.
Figure 21B:
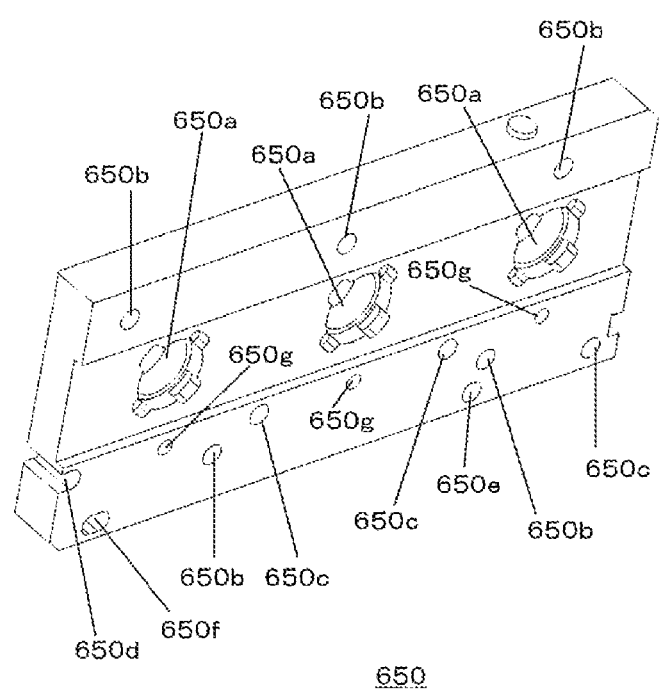

Subsequently, FIG. 21A and FIG. 21B each is a perspective view illustrating an appearance of LD holder 650, and FIG. 21A is a perspective view of LD holder 650 as viewed from its front side, and FIG. 21B is a perspective view of LD holder 650 as viewed from its back side.

LD holder 650 is formed of a material having a high thermal conductivity. It is preferable that the material be copper, a copper alloy, or the like. In each of FIG. 21A and FIG. 21B, 650a denotes LD attachment holes formed to attach respective three LDs, and 650b denotes a heat sink attachment hole for attaching heat sink 700. 650c and 650d each is an attachment hole for a screw for attaching LD holder 650 to optical base unit 550, and are formed at the positions to match respective screw holes 550b of optical base unit 550.

650e and 650f are positioning holes in which respective positioning pins 550d of optical base unit 550 are inserted. Note that, positioning hole 650e is a circle hole, but positioning hole 650f is formed as an oblong hole.

650g denotes an adjustment screw hole for attaching an adjustment screw (not shown) for performing focus adjustment of first collimator module 204, second collimator module 205, and third collimator module 206 illustrated in FIG. 17.

Note that soldering is performed to fill a narrow gap between each of the LDs and the inner surface of the LD attachment hole 650a so that the heat generated in each of LDs is surely transferred to LD holder 650.

Figure 22A:
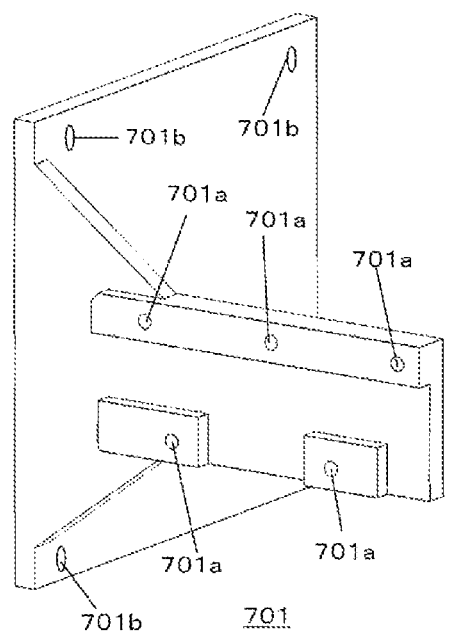
FIGS. 22A and 22B each is a perspective view illustrating an appearance of a heat sink in the optical module (light source device) according to the second exemplary embodiment.
Figure 22B:
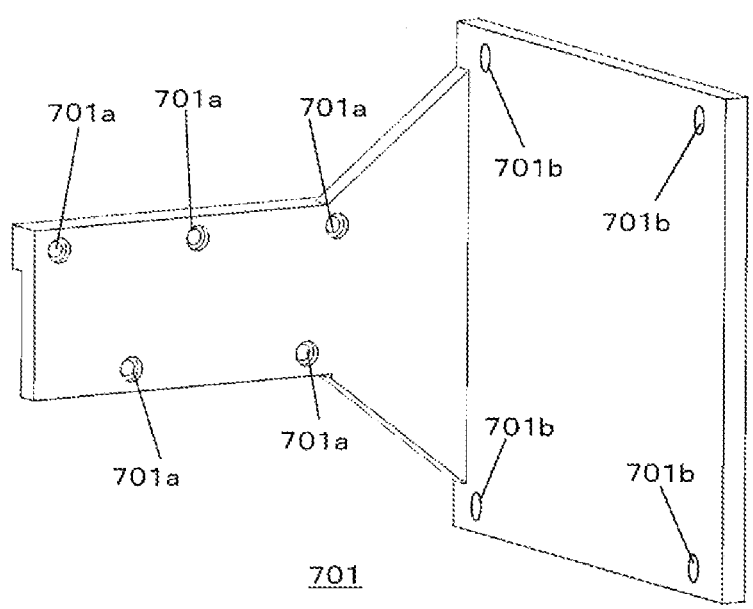

FIG. 22A and FIG. 22B each is a perspective view illustrating an appearance of heat sink 701, and FIG. 22A is a perspective view of heat sink 701 as viewed from the side where heat sink 701 is in contact with the back surface of LD holder 650, and FIG. 22B is a perspective view of heat sink 701 as viewed from the side opposite to the side in FIG. 22A.

Heat sink 701 is made of copper (may be a copper alloy). As illustrated in FIG. 22A and FIG. 22B, heat sink 701 has a plurality of screw holes 701a for attaching heat sink 701 to LD holder 650, and a plurality of screw holes 701b for joining heat sink 701 and radiation fin 703.

Figure 23:
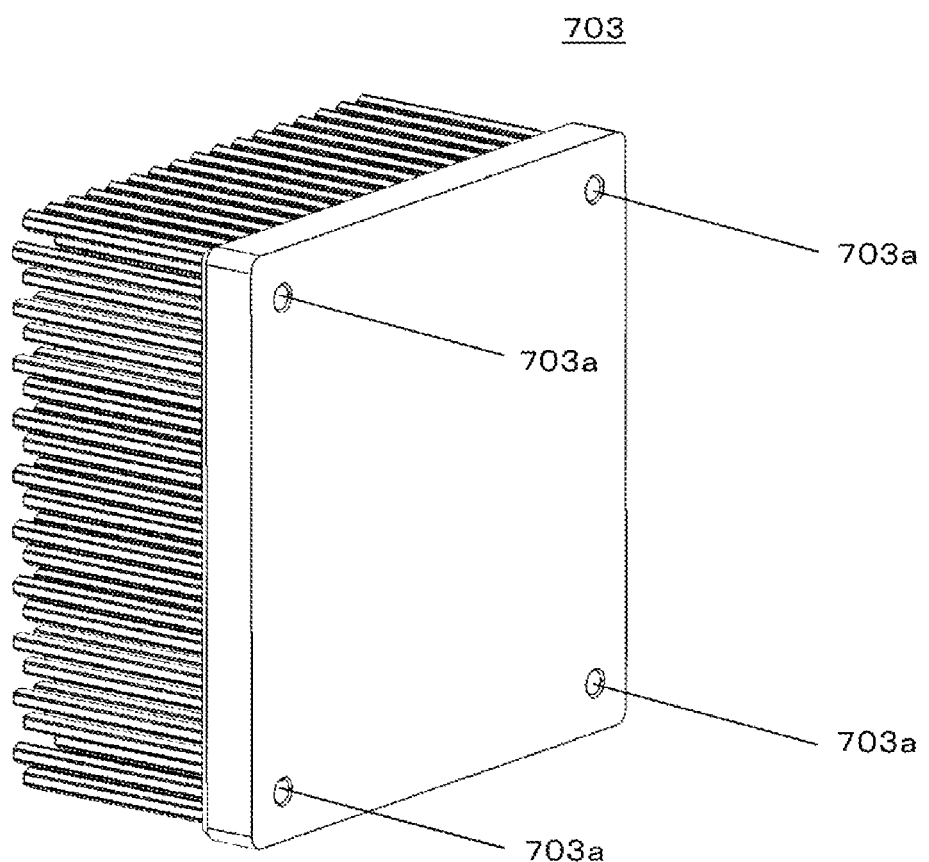
FIG. 23 is a perspective view illustrating an appearance of a radiation fin in the optical module (light source device) according to the second exemplary embodiment.

FIG. 23 is a perspective view illustrating an appearance of radiation fin 703. Radiation fin 703 is made of an aluminum die-casting. As illustrated in FIG. 23, screw hole 703a is formed in radiation fin 703.

Peltier element 702 is disposed between heat sink 701 and radiation fin 703, and heat sink 701 and radiation fin 703 are joined each other with screws. With this configuration, Peltier element 702 is sandwiched between heat sink 701 and radiation fin 703 to be fixed (see FIG. 15 to FIG. 17).

An operation guarantee temperature of LD 201 (laser diode for blue color), LD 202 (laser diode for green color), and LD 203 (laser diode for red color) used in the exemplary embodiment is about 65° C., but a laser diode having an operation guarantee temperature of 85° C. exists depending on its manufacturer (any of the laser diodes has a problem in that its brightness decreases as its temperature becomes high although no breakage occurs as long as its temperature is within its operation guarantee temperature).

In the exemplary embodiment, although LD holder 650 and optical base unit 550 are fitted by screws, the back surface of optical base unit 550 and the front surface of LD holder 650 are in contact with each other at protruding portions 550c formed on the back surface of optical base unit 550. That is, LD holder 650 and optical base unit 550 are configured to contact with each other in fine areas of the tips of the plurality of protruding portions 550c, making it possible to prevent the brightness of LD from being lowered and prevent the LD from being broken due to temperature increase of LD caused by the heat transferred to the LD holder from optical base unit 550.

Subsequently, results will be described that compare the case where protruding portions 550c is eliminated from the back surface of optical base unit 550, and the back surface of optical base unit 550 and the front surface of LD holder 650 are made contact with each other in a wide area, and the case where the back surface of optical base unit 550 and the front surface of LD holder 650 are made contact with each other in fine areas of the tips of the plurality of protruding portions 550c like the exemplary embodiment.

When optical module 121 is operated under a high temperature environment of 85° C., in the case where no protruding portion 550c exists, the temperature of optical base unit 550 is lowered by about 11° C. from the external temperature, and the temperature of LD holder 650 is lowered by about 12° C. from the external temperature. The lowering of the temperature of the LD with respect to the external temperature is stopped at about 11° C. On the other hand, when protruding portions 550c are provided, the lowering of the temperature with respect to the external temperature is stopped at about 5° C. at optical base unit 550, so that the lowering of the temperature of LD holder 650 becomes 26° C. and the lowering of the temperature of the LD becomes about 23° C., improving the cooling efficiency.

As described above, when no protruding portion 550c exists, a lot of heat is disadvantageously transferred to LD holder 650 from optical base unit 550, so that even when heat is radiated by cooling unit 700, the temperature of LD holder 650 and the LD is disadvantageously increased to near the environment temperature. In contrast, when the protruding portions 550c are provided, it is proved that transfer of heat from optical base unit 550 to LD holder 650 is suppressed, and temperatures of LD holder 650 and the LD are kept at temperatures far lower than the environment temperature.

Furthermore, in the above description, although the back surface of optical base unit 550 and the front surface of the LD holder 650 are made contact with each other at fine areas of the tips of the plurality of protruding portions 550c, a heat insulating member may be sandwiched between the back surface of optical base unit 550 and the front surface of LD holder 650. However, accuracy is required in light emission position of the LD and in inclination of the optical axis of the LD, so that it is desirable that, for example, the heat insulating member have holes at the portions corresponding to the positions of protruding portions 550c to prevent another member from being sandwiched between protruding portions 550c and LD holder 650.

The configuration of the above exemplary embodiment is only an example, and it goes without saying that the present disclosure can be also appropriately applied to a configuration other than the mode exemplified in the description and the drawings.

The present disclosure can be applied to a light source device using a laser light source, an image display apparatus using the light source device, and the like.

What is claimed is:

1. A light source device comprising:
    a laser light source that emits laser light;
    a first adjustment mechanism that receives the laser light incident from the laser light source, and performs an emission angle adjustment of the laser light and a focus adjustment of the laser light;
    a second adjustment mechanism that receives the laser light incident from the first adjustment mechanism, and performs a positional adjustment of the laser light incident from the first adjustment mechanism; and
    a mirror that receives the laser light incident from the second adjustment mechanism, and emits the laser light incident from the second adjustment mechanism in a predetermined direction,
    wherein the second adjustment mechanism includes a parallel flat plate transmitting the laser light, an adjustment mechanism changing an inclination of the parallel flat plate, and an adjustment mechanism rotating the parallel flat plate.

2. The light source device according to claim 1, wherein the first adjustment mechanism includes a collimator lens, and an adjustment mechanism changing an optical center of the collimator lens.

3. The light source device according to claim 1, wherein the laser light source includes a first laser light source emitting red laser light, a second laser light source emitting blue laser light, and a third laser light source emitting green laser light.

4. The light source device according to claim 3, wherein the light source device comprises the first adjustment mechanism and the second adjustment mechanism with respect to each of the first laser light source, the second laser light source, and the third laser light source.

5. An image display apparatus comprising the light source device according to claim 1.

6. A light source device comprising:
    a light source emits laser light;
    a light source holding unit to which the light source is attached; and
    a base unit coupled with the light source holding unit,
    wherein a protruding portion is formed on at least one of the light source holding unit and the base unit between the light source holding unit and the base unit, and the light source holding unit and the base unit are in contact with each other at the protruding portion.

7. The light source device according to claim 6, wherein a cooling unit is further attached to the light source holding unit.

8. The light source device according to claim 6, wherein the light source holding unit and the base unit are formed of a metal.

9. The light source device according to claim 6, wherein the light source includes a laser diode.

10. The light source device according to claim 6, wherein a mechanism is mounted on the base unit, the mechanism performing an optical adjustment of the laser light from the light source.

11. An image display apparatus comprising the light source device according to claim 6.

* * * * *